(12) United States Patent
Liu

(10) Patent No.: US 11,355,073 B2
(45) Date of Patent: Jun. 7, 2022

(54) CONTROL CIRCUIT, DISPLAY APPARATUS AND METHOD FOR SUPPLYING POWER TO LIGHT SOURCE IN DISPLAY APPARATUS

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventor: Dong Liu, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 743 days.

(21) Appl. No.: 16/316,247

(22) PCT Filed: May 31, 2018

(86) PCT No.: PCT/CN2018/089171
§ 371 (c)(1),
(2) Date: Jan. 8, 2019

(87) PCT Pub. No.: WO2019/047572
PCT Pub. Date: Mar. 14, 2019

(65) Prior Publication Data
US 2021/0335285 A1 Oct. 28, 2021

(30) Foreign Application Priority Data
Sep. 5, 2017 (CN) .......................... 201710792017.9

(51) Int. Cl.
*G09G 3/34* (2006.01)
*G09G 3/36* (2006.01)
(Continued)

(52) U.S. Cl.
CPC ............. *G09G 3/3406* (2013.01); *G09G 3/36* (2013.01); *H02J 7/0013* (2013.01);
(Continued)

(58) Field of Classification Search
CPC ........ G09G 3/34; G09G 3/36; G09G 2330/02; G09G 2330/021; H02J 7/0024;
(Continued)

(56) References Cited

U.S. PATENT DOCUMENTS 6,970,723 B2 11/2005 Chigira
2003/0117422 A1 6/2003 Hiyama et al.
(Continued)

FOREIGN PATENT DOCUMENTS

CN 201194077 Y 2/2009
CN 101533634 A 9/2009
(Continued)

OTHER PUBLICATIONS

International Search Report dated Aug. 13, 2018 corresponding to application No. PCT/CN2018/089171.
(Continued)

*Primary Examiner* — Nelson M Rosario
(74) *Attorney, Agent, or Firm* — Nath, Goldberg & Meyer; Joshua B. Goldberg

(57) ABSTRACT

The present disclosure provides a control circuit, a display apparatus, and a method for supplying power to a light source in a display apparatus. The control circuit includes a first power source, a second power source, and a control device. The first power source and the second power source are both coupled to the control device. The control device is configured to control a connection between the first power source and a light source and a connection between the second power source and the light source.

16 Claims, 3 Drawing Sheets

(51) Int. Cl.
   *H02J 7/00* (2006.01)
   *H02J 7/35* (2006.01)
(52) U.S. Cl.
   CPC .......... *H02J 7/0029* (2013.01); *H02J 7/0047* (2013.01); *H02J 7/35* (2013.01); *G09G 2300/0426* (2013.01); *G09G 2310/0291* (2013.01); *G09G 2330/021* (2013.01)
(58) Field of Classification Search
   CPC ........ H02J 7/0036; H02J 7/0068; H02J 7/007; H02J 7/00302; H02J 7/00306
   See application file for complete search history.

(56) References Cited

U.S. PATENT DOCUMENTS

| | | | |
|---|---|---|---|
| 2003/0178951 A1 | 9/2003 | Park et al. | |
| 2013/0050280 A1* | 2/2013 | Huang | G09G 3/3406 345/690 |
| 2013/0257827 A1* | 10/2013 | Hsieh | G09G 3/342 345/204 |
| 2015/0362982 A1 | 12/2015 | Yu | |
| 2018/0053463 A1* | 2/2018 | Kong | G09G 3/2092 |

FOREIGN PATENT DOCUMENTS

| | | |
|---|---|---|
| CN | 101540150 A | 9/2009 |
| CN | 101583228 A | 11/2009 |
| CN | 101714334 A | 5/2010 |
| CN | 101923841 A | 12/2010 |
| CN | 102055935 B | 7/2014 |
| CN | 104035892 A | 9/2014 |
| CN | 104200780 A | 12/2014 |
| JP | H04128865 A | 4/1992 |
| JP | 3198480 B2 | 8/2001 |
| JP | 2001272943 A | 10/2001 |
| KR | 20150000151 A | 1/2015 |

OTHER PUBLICATIONS

First Office Action dated Jan. 3, 2020, for corresponding Chinese application 201710792017.9.
Anonymous: 11 Inverting Op-Amp Resistor 3 Calculator—Electrical Engineering & Electronics Tools 11 , All about circuits, Mar. 12, 2016 (Mar. 12, 2016), XP055784218, Retrieved from the Internet: URL:https://web.archive.org/web/20160312221958/https://www.allaboutcircuits.com/tools/inverting-op-amp-resistor-calculator/ [retrieved on Mar. 10, 2021] * section 11 Applications 11 *.
Edn: 11 MOSFET pair makes simple SPOT switch—EON 11, Dec. 9, 1999 (Dec. 9, 1999), pp. 1-2, XP055784246, Retrieved from the Internet: URL:https://www.edn.com/mosfet-pair-makessimple- spdt-switch/ [retrieved on Mar. 10, 2021] * the whole document*.
Corrected Extended European Search Report dated Apr. 27, 2021 corresponding to application No. 18825851.1.

\* cited by examiner

CONTROL CIRCUIT, DISPLAY APPARATUS AND METHOD FOR SUPPLYING POWER TO LIGHT SOURCE IN DISPLAY APPARATUS

CROSS-REFERENCE TO RELATED APPLICATION

This is a National Phase Application filed under 35 U.S.C. 371 as a national stage of PCT/CN2018/089171, filed on May 31, 2018, an application claiming the benefit of priority to Chinese Patent Application No. 201710792017.9 filed on Sep. 5, 2017, the contents of which are incorporated herein in their entirety by reference.

TECHNICAL FIELD

The present disclosure relates to the field of display technology, and in particular to a control circuit, a display apparatus including the control circuit, and a method for supplying power to a light source in the display apparatus.

BACKGROUND

In daily life, the battery life of a display apparatus such as a mobile phone has always been a major concern for a user of the display apparatus. A Liquid Crystal Display (LCD) module is an important component of a display apparatus, and power consumption thereof accounts for 40% to 80% of an overall power consumption of the display apparatus. Power consumption of a backlight in the LCD module accounts for 80% of an overall power consumption of the LCD module.

SUMMARY

The present disclosure provides a control circuit, a display apparatus including the control circuit, and a method for supplying power to a light source in the display apparatus.

The control circuit provided in the present disclosure includes a first power source, a second power source, and a control device. The first power source and the second power source are both coupled to the control device. The control device is configured to control a connection between the first power source and a light source and a connection between the second power source and the light source.

In some embodiments of the present disclosure, the control device includes a first switch element, a second switch element, a signal generating circuit, and an inverting circuit; the first switch element is coupled to the first power source, the light source, and the signal generating circuit; the second switch element is coupled to the second power source, the light source, and the inverting circuit; and the inverting circuit is coupled to the signal generating circuit; and the signal generating circuit is configured to: control the connection between the first power source and the light source through the first switch element; and control the connection between the second power source and the light source through the inverting circuit and the second switch element.

In some embodiments of the present disclosure, the first switch element includes a first switch transistor, a first electrode of the first switch transistor is coupled to the first power source, a second electrode of the first switch transistor is coupled to the light source, and a control electrode of the first switch transistor is coupled to the signal generating circuit.

In some embodiments of the present disclosure, the inverting circuit is an inverting amplifier, an input terminal of the inverting amplifier is coupled to the signal generating circuit, and an output terminal of the inverting amplifier is coupled to the second switch element.

In some embodiments of the present disclosure, the second switch element includes a second switch transistor, a first electrode of the second switch transistor is coupled to the second power source, a second electrode of the second switch transistor is coupled to the light source, and a control electrode of the second switch transistor is coupled to the inverting circuit.

In some embodiments of the present disclosure, the control device includes a first switch element, a second switch element, and a signal generating circuit, the first switch element is coupled to the first power source, the light source, and the signal generating circuit, and the second switch element is coupled to the second power source, the light source, and the signal generating circuit; and the signal generating circuit is configured to: control the connection between the first power source and the light source through the first switch element; and control the connection between the second power source and the light source through the second switch element.

In some embodiments of the present disclosure, the first switch element includes a first switch transistor, a first electrode of the first switch transistor is coupled to the first power source, a second electrode of the first switch transistor is coupled to the light source, and a control electrode of the first switch transistor is coupled to the signal generating circuit;

the second switch element includes a second switch transistor, a first electrode of the second switch transistor is coupled to the second power source, a second electrode of the second switch transistor is coupled to the light source, and a control electrode of the second switch transistor is coupled to the signal generating circuit; and the first switch transistor is an N-type thin film transistor, and the second switch transistor is a P-type thin film transistor; or the first switch transistor is a P-type thin film transistor, and the second switch transistor is an N-type thin film transistor.

In some embodiments of the present disclosure, the signal generating circuit is a microcontroller unit.

In some embodiments of the present disclosure, the first power source includes a first energy storage device, a first charging control chip, and a photovoltaic array, the photovoltaic array is coupled to the first energy storage device and the first charging control chip, and the first charging control chip is coupled to the first energy storage device; and the first charging control chip is configured to monitor a quantity of electricity of the first energy storage device and control the photovoltaic array to charge the first energy storage device.

In some embodiments of the present disclosure, the second power source includes a second energy storage device, a second charging control chip, and a power supply device, and the second charging control chip is configured to monitor a quantity of electricity of the second energy storage device and control the power supply device to charge the second energy storage device.

In some embodiments of the present disclosure, the second energy storage device is a lithium battery, and the power supply device is a charger suitable for the second energy storage device.

In some embodiments of the present disclosure, the first power source is configured to supply power to the light source by a constant voltage and a constant current in response to being coupled to the light source, and the second power source is configured to supply power to the light source by a constant voltage and a constant current in response to being coupled to the light source.

The present disclosure also provides a display apparatus including a light source, a display panel, and the above-described control circuit.

In some embodiments of the present disclosure, the first power source is configured to supply power only to the light source, and the second power source is configured to supply power to other functional structure of the display apparatus in addition to the light source.

In some embodiments of the present disclosure, during a process in which the control device controls a power source of the light source to be switched from the second power source to the first power source, the other functional structure of the display apparatus keeps coupled to the second power source.

The present disclosure also provides a method for supplying power to a light source in a display apparatus, the display apparatus including a light source and a control circuit, the control circuit including a first power source, a second power source, and a control device, the first power source and the second power source being both coupled to the control device; and the method including:

controlling, by the control device, at least one of the first power source and the second power source to supply power to the light source.

In some embodiments of the present disclosure, the control device includes a first switch element, a second switch element, a signal generating circuit, and an inverting circuit; the first switch element is coupled to the first power source, the light source, and the signal generating circuit, the second switch element is coupled to the second power source, the light source, and the inverting circuit, and the inverting circuit is coupled to the signal generating circuit;

controlling, by the control device, the first power source to supply power to the light source includes:

controlling, by the signal generating circuit, the first power source to be coupled to the light source through the first switch element to enable the first power source to supply power to the light source; and controlling, by the control device, the second power source to supply power to the light source includes:

controlling, by the signal generating circuit, the second power source to be coupled to the light source through the inverting circuit and the second switch element to enable the second power source to supply power to the light source.

In some embodiments of the present disclosure, the control device includes a first switch element, a second switch element, and a signal generating circuit; the first switch element is coupled to the first power source, the light source, and the signal generating circuit, and the second switch element is coupled to the second power source, the light source, and the signal generating circuit;

controlling, by the control device, the first power source to supply power to the light source includes:

controlling, by the signal generating circuit, the first power source to be coupled to the light source through the first switch element to enable the first power source to supply power to the light source; and controlling, by the control device, the second power source to supply power to the light source includes:

controlling, by the signal generating circuit, the second power source to be coupled to the light source through the second switch element to enable the second power source to supply power to the light source.

In some embodiments of the present disclosure, the method further includes: controlling, by the control device, a power source of the light source to be switched from the second power source to the first power source, the step of controlling, by the control device, the power source of the light source to be switched from the second power source to the first power source includes: receiving, by the signal generating circuit, a power source selection instruction of selecting the first power source to supply power to the light source; controlling a display panel of the display apparatus to enter a sleep mode and/or turning off the light source of the display panel according to the power source selection instruction; controlling the first power source to be coupled to the light source; controlling the second power source to be disconnected from the light source; and lighting the light source of the display panel again.

In some embodiments of the present disclosure, during a process in which the control device controls the power source of the light source to be switched from the second power source to the first power source, other functional structures of the display apparatus keep coupled to the second power source.

DETAILED DESCRIPTION

In order to enable those skilled in the art to better understand the technical solutions of the present disclosure, a control circuit, a display apparatus and a method for supplying power to a light source in a display apparatus are described in detail below with reference to the accompanying drawings.

Generally, a backlight of an LCD module and functional structures, such as a radio frequency device, a wireless data communication device, an intelligent operation device and the like, of a display apparatus share one common power source. Due to the large power consumption of the backlight of the LCD module, the battery life of the display apparatus is degraded. In view of this problem, the present disclosure provides a control circuit, a display apparatus including the control circuit, and a method for supplying power to a light source in the display apparatus.

Figure 1:
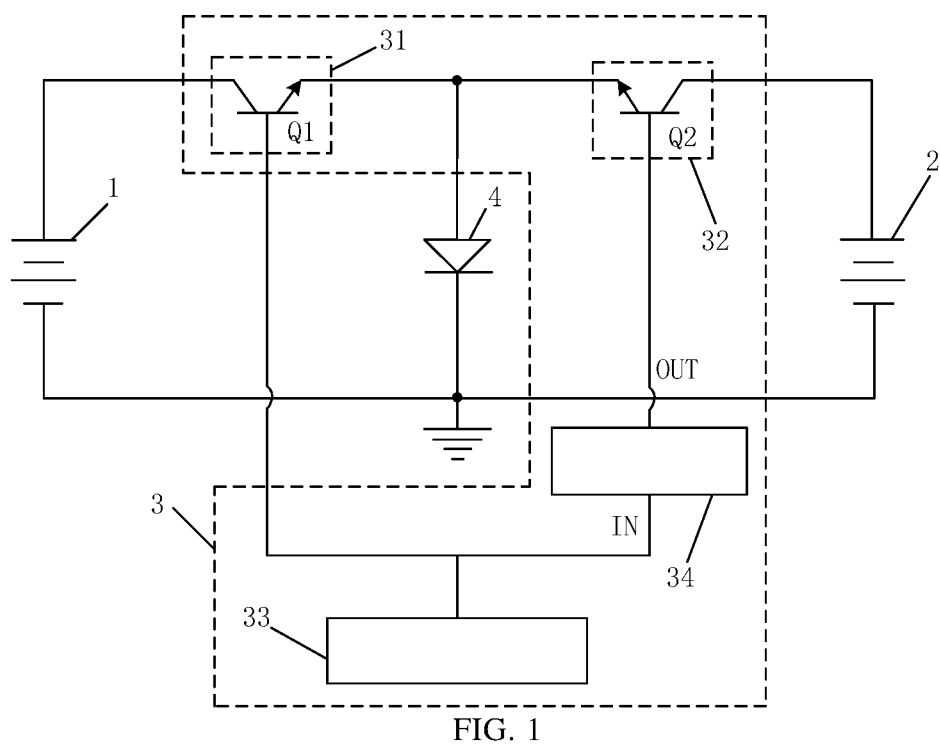
FIG. 1 is a schematic structural diagram of a control circuit according to an embodiment of the present disclosure.

FIG. 1 is a schematic structural diagram of a control circuit according to an embodiment of the present disclosure. As shown in FIG. 1, the control circuit includes a first power source 1, a second power source 2, and a control device 3. The first power source 1 and the second power source 2 are both coupled to the control device 3.

According to an embodiment of the present disclosure, the control device 3 is configured to control the first power source 1 or the second power source 2 to supply power to a light source 4. The control device 3 determines which power source supplies power to the light source 4, and therefore, the light source 4 may be powered by the first power source 1 separately, and the power source of the light source 4 can be switched between the first power source 1 and the second power source 2.

The control circuit according to an embodiment of the present disclosure can be applied to a display apparatus. In some embodiments, the display apparatus includes a display panel, a light source, and a control circuit for switching between the first power source 1 and the second power source 2 that supply power to the light source 4. In some embodiments of the present disclosure, the first power source 1 is configured to supply power only to the light source 4, and the second power source 2 is configured to also supply power to other functional structures such as a radio frequency device, a wireless data communication device, an intelligent operation device and the like in the display apparatus. By having the control circuit, an additional power source (for example, the first power source 1) is provided for the light source 4 of the display apparatus, so that the light source 4 can be separately powered by the first power source 1. Accordingly, the light source 4 does not need to share one common power source with other functional structures such as the radio frequency device, the wireless data communication device, the intelligent operating device and the like of the display apparatus. For example, the light source 4 does not need to share the second power source 2 with other functional structures such as the radio frequency device, the wireless data communication device, the intelligent operating device and the like of the display apparatus, thereby avoiding large power consumption caused by the use of the common power source for the light source 4. In some embodiments of the present disclosure, the light source 4 is a backlight, for example, the light source 4 includes a light emitting diode (LED). In some embodiments of the present disclosure, the display apparatus may include a terminal device such as a mobile phone or a tablet computer. In some embodiments of the present disclosure, the display panel may be an LCD display panel.

In some embodiments of the present disclosure, in the case where the light source 4 is powered by the first power source 1, the second power source 2 only needs to supply power to other functional structures of the display apparatus, and does not need to supply power to the light source 4.

In the embodiment of the present disclosure, the process of switching between the first power source 1 and the second power source 2 that supply power to the light source 4 may include two cases: in one case, the light source 4 is first powered by the second power source 2, and then powered by the first power source 1 after a switch is made from the second power source 2 to the first power source 1; in another case, the light source 4 is first powered by the first power source 1, and then powered by the second power source 2 after a switch is made from the first power source 1 to the second power source 2. When it is required to switch from the first power source 1 to the second power source 2, for example, when the quantity of electricity of the first power source 1 is lower than a first preset value or when a user of the display apparatus selects the second power source 2 to supply power to the light source 4 through a power setting device in an operating system of the display apparatus as needed, the control device 3 can control the second power source 2 to supply power to the light source 4. For the light source 4, the first power source 1 or the second power source 2 separately supplies power to the light source 4 under the control of the control circuit, thereby ensuring the safety and reliability of the control circuit. In this embodiment, the first power source 1 is only used to supply power to the light source 4, and when the power source that supplies power to the light source 4 is switched from the first power source 1 to the second power source 2 as needed, the second power source 2 serves as a common power source for the light source 4 and the other functional structures of the display apparatus, and supply power to both the light source 4 and the other functional structures of the display apparatus.

In some embodiments, as shown in FIG. 1, the control device 3 includes a first switch element 31, a second switch element 32, a signal generating circuit 33, and an inverting circuit 34, the first switch element 31 is coupled to the first power source 1, the light source 4 and the signal generating circuit 33, the second switch element 32 is coupled to the second power source 2, the light source 4, and the inverting circuit 34, and the inverting circuit 34 is coupled to the signal generating circuit 33. In some embodiments of the present disclosure, an output terminal OUT of the inverting circuit 34 is coupled to the second switch element 32, and an input terminal IN of the inverting circuit 34 is coupled to the signal generating circuit 33.

The signal generating circuit 33 is configured to control the connection of the first power source 1 with the light source 4 through the first switch element 31; and control the connection of the second power source 2 with the light source 4 through the inverting circuit 34 and the second switch element 32.

In some embodiments, the signal generating circuit 33 is configured to provide a control signal to the first switch element 31 and the inverting circuit 34. In some embodiments of the present disclosure, the control signal may be a high level signal or a low level signal.

The first switch element 31 is configured to control the connection of the first power source 1 with the light source 4 to control the first power source 1 to supply power to the light source 4. In some embodiments of the present disclosure, the first switch element 31 is configured to control the first power source 1 to be coupled to or disconnected from the light source 4 according to the control signal from the signal generating circuit 33. For example, when the control signal is a high level signal, the first switch element 31 is turned on by the high level signal, so that the first power source 1 is coupled to the light source 4, and at this time, the first power source 1 is used to supply power to the light source 4; when the control signal is a low level signal, the first switch element 31 is turned off by the low level signal, so that the first power source 1 is disconnected from the light source 4.

The inverting circuit 34 is configured to invert the control signal provided by the signal generating circuit 33 to generate an inverted signal, and output the inverted signal to the second switch element 32. For example, when the control signal is a high level signal, that is, when a high level signal is written into the input terminal IN of the inverting circuit 34, the inverting circuit 34 inverts the high level signal to obtain a low level signal, so that the inverted signal outputted from the output terminal OUT of the inverting circuit 34 is a low level signal.

The second switch element 32 is configured to control the connection of the second power source 2 with the light source 4 to control the second power source 2 to supply power to the light source 4. In some embodiments of the present disclosure, the second switch element 32 is configured to control the second power source 2 to be coupled to or disconnected from the light source 4 according to the inverted signal outputted from the output terminal OUT of the inverting circuit 34. For example, when the control signal is a low level signal, the first switch element 31 is turned off by the low level signal, and the first power source 1 is disconnected from the light source 4; meanwhile, the low level signal is written into the input terminal IN of the inverting circuit 34, the inverting circuit 34 inverts the low level signal to obtain a high level signal, so that the high level signal is outputted from the output terminal OUT of the inverting circuit 34 to the second switch element 32, and the second switch element 32 is turned on by the high level signal, so that the second power source 2 is coupled to the light source 4, and at this time, the second power source 2 is used to supply power to the light source 4. For another example, when the control signal is a high level signal, the first switch element 31 is turned on, and the first power source 1 supplies power to the light source 4; meanwhile, the high level signal is written into the input terminal IN of the inverting circuit 34, the inverting circuit 34 inverts the high level signal to obtain a low level signal, the low level signal is outputted from the output terminal OUT of the inverting circuit 34 to the second switch element 32, and thereby, the second switch element 32 is turned off by the low level signal, so that the second power source 2 is disconnected from the light source.

In some embodiments, the first switch element 31 includes a first switch transistor Q1, a first electrode of the first switch transistor Q1 is coupled to the first power source 1, a second electrode of the first switch transistor Q1 is coupled to the light source 4, and a control electrode of the first switch transistor Q1 is coupled to the signal generating circuit 33. In some embodiments of the present disclosure, the first electrode of the first transistor Q1 is coupled to a first terminal of the first power source 1, a second terminal of the first power source 1 is grounded, the second electrode of the first switch transistor Q1 is coupled to a first terminal of the light source 4, and a second terminal of the light source 4 is grounded. The signal generating circuit 33 outputs a first control signal, for example, a high level signal, to the control electrode of the first switch transistor Q1, the first switch transistor Q1 is turned on under the control of the first control signal to control the first power source 1 to be coupled to the light source 4, and thus the first power source 1 supplies power to the light source 4; or the signal generating circuit 33 outputs a second control signal, for example, a low level signal, to the control electrode of the first switch transistor Q1, the first switch transistor Q1 is turned off under the control of the second control signal to control the first power source 1 to be disconnected from the light source 4.

In this embodiment, the second switch element 32 includes a second switch transistor Q2, a first electrode of the second switch transistor Q2 is coupled to the second power source 2, a second electrode of the second switch transistor Q2 is coupled to the light source 4, and a control electrode of the second switch transistor Q2 is coupled to the inverting circuit 34. In some embodiments of the present disclosure, the first electrode of the second switch transistor Q2 is coupled to a first terminal of the second power source 2, the second electrode of the second switch transistor Q2 is coupled to the first terminal of the light source 4, a second terminal of the second power source 2 is grounded, and the control electrode of the second switch transistor Q2 is coupled to the output terminal OUT of the inverting circuit 34. The signal generating circuit 33 writes the second control signal, for example, a low level signal, to the input terminal IN of the inverting circuit 34, the inverting circuit 34 inverts the second control signal to output the first control signal, for example, a high level signal, from the output terminal OUT of the inverting circuit 34 to the control electrode of the second switch transistor Q2, so that the second switch transistor Q2 is turned on by the high level signal outputted from the output terminal OUT of the inverting circuit 34, thereby controlling the second power source 2 to be coupled to and supply power to the light source 4; or, the signal generating circuit 33 writes the first control signal, for example, a high level signal, to the input terminal IN of the inverting circuit 34, the inverting circuit 34 inverts the first control signal to output the second control signal, for example, a low level signal, from the output terminal OUT of the inverting circuit 34 to the control electrode of the second switch transistor Q2, so that the second switch transistor Q2 is turned off by the low level signal outputted from the output terminal OUT of the inverting circuit 34, thereby controlling the second power source 2 to be disconnected from the light source 4.

In some embodiments of the present disclosure, the first switch transistor Q1 and the second switch transistor Q2 are both N-type thin film transistors. In some embodiments of the present disclosure, the first switch transistor Q1 and the second switch transistor Q2 may be P-type thin film transistors. It is to be noted that only the case where the first switch transistor Q1 and the second switch transistor Q2 are N-type thin film transistors is shown in FIG. 1. The case where the first switch transistor Q1 and the second switch transistor Q2 are P-type thin film transistors is similar to the case where the first switch transistor Q1 and the second switch transistor Q2 are N-type thin film transistors, except that the levels of the control signals are opposite, which will not be described in detail herein.

In some embodiments, the signal generating circuit 33 is a Microcontroller Unit (MCU). In some embodiments of the present disclosure, the signal generating circuit 33 is configured to receive a power source selection instruction and transmit a control signal to the first switch element 31 and the inverting circuit 34 according to the power source selection instruction. For example, in practical applications, when the user selects the first power source 1 to supply power to the light source 4 on the display apparatus, i.e., inputs the power source selection instruction to the signal generating circuit 33, the signal generating circuit 33 may transmit a control signal, for example, a high level signal, to the first switch element 31 and the inverting circuit 34 according to the power source selection instruction, so that the first switching element 31 is turned on by the high level signal, and thus the first power source 1 is coupled to the light source 4 to supply power to the light source 4; at the same time, the inverting circuit 34 inverts the high level signal to output a low level signal from the output terminal OUT thereof, and therefore, the second switch element 32 is turned off by the low level signal, thereby disconnecting the second power source 2 from the light source 4.

Figure 2:
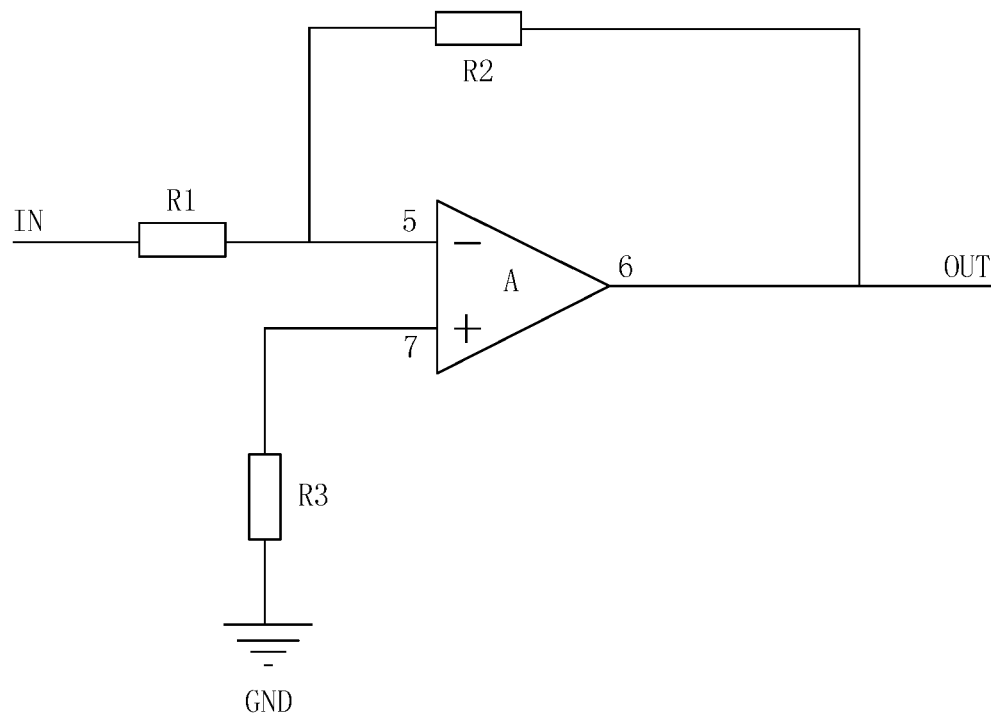
FIG. 2 is a circuit diagram of an inverting circuit in the control circuit shown in FIG. 1.

In some embodiments, the inverting circuit 34 includes an inverting amplifier, the input terminal IN of the inverting amplifier is coupled to the signal generating circuit 33, and the output terminal OUT of the inverting amplifier is coupled to the second switch element 32. In some embodiments of the present disclosure, the output terminal OUT of the inverting amplifier is coupled to the control electrode of the second switch element 32. FIG. 2 is a schematic structural diagram of the inverting circuit of FIG. 1. As shown in FIG. 2, the inverting amplifier includes an operational amplifier A, a first resistor R1, a second resistor R2, and a third resistor R3. A first terminal of the first resistor R1 is coupled to an inverting input terminal 5 of the operational amplifier A, a second terminal of the first resistor R1 is the input terminal IN of the inverting amplifier, a first terminal of the second resistor R2 is coupled to the inverting input terminal 5 of the operational amplifier A, a second terminal of the second resistor R2 is coupled to an output terminal 6 of the operational amplifier A (the output terminal OUT of the inverting amplifier), a first terminal of the third resistor R3 is coupled to a non-inverting input terminal 7 of the operational amplifier A, and a second terminal of the third resistor R3 is grounded. In some embodiments of the present disclosure, the first resistor R1 has a resistance value R, the second resistor R2 has a resistance value R, i.e., the first resistor R1 and the second resistor R2 have a same resistance value, and the third resistor R3 is an impedance matching balance resistor for a differential signal. It is assumed that a voltage of the non-inverting input terminal 7 is $V_+$, a voltage of the inverting input terminal 5 is $V_-$, a voltage of the input terminal IN is $V_{in}$, and a voltage of the output terminal OUT is $V_{out}$. The working principle of the inverting amplifier is as follows: according to the ideal characteristics of the inverting amplifier, the voltage of the non-inverting input terminal 7 is equal to the voltage of the inverting input terminal 5 of the operational amplifier A, that is: $V_+=V_-$, and a current flowing through the first resistor R1 is equal to a current flowing through the second resistor R2, i.e., $I_1=I_2$, where $I_1$ is the current flowing through the first resistor R1, and $I_2$ is the current flowing through the second resistor R2. It can be seen that the relationship between the voltage $V_{in}$ of the input terminal IN and the voltage $V_{out}$ of the output terminal OUT is:

$$\frac{V_{in} - V_+}{R} = \frac{V_- - V_{out}}{R}$$

that is, $V_{in}=-V_{out}$. Therefore, when a high level signal is inputted to the input terminal IN, a low level signal is outputted from the output terminal OUT; when a low level signal is inputted to the input terminal IN, a high level signal is outputted from the output terminal OUT.

Figure 3:
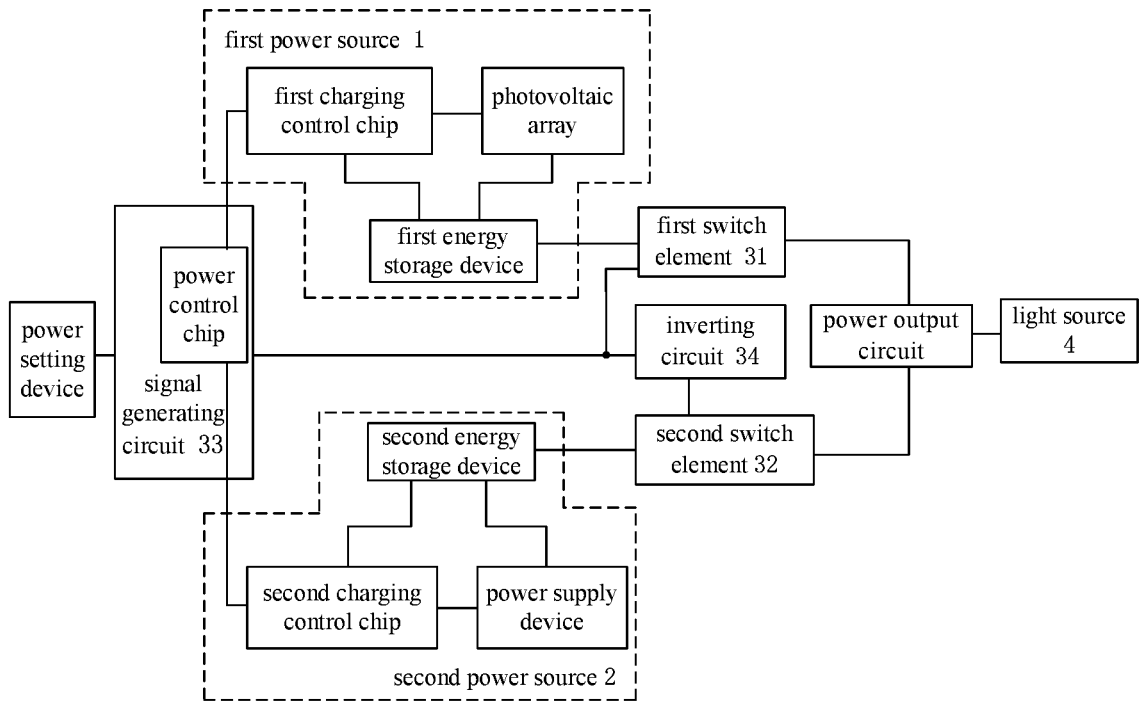
FIG. 3 is a functional block diagram of a control circuit according to an embodiment of the present disclosure.

FIG. 3 is a functional block diagram of a control circuit according to an embodiment of the present disclosure. As shown in FIG. 3, in some embodiments, the first power source 1 includes a first energy storage device, a first charging control chip, and a photovoltaic array. In some embodiments of the present disclosure, the first energy storage device is a battery, such as a lead acid battery, a nickel cadmium battery, a nickel hydrogen battery, or the like. In this embodiment, the photovoltaic array is coupled to the first energy storage device and the first charging control chip, the first charging control chip is coupled to the first energy storage device, a first terminal of the first energy storage device is coupled to the first electrode of the first switch transistor Q1, and a second terminal of the first energy storage device is grounded. The first charging control chip is configured to monitor the quantity of electricity of the first energy storage device and control the photovoltaic array to charge the first energy storage device, and the first energy storage device is configured to supply power to the light source 4. In some embodiments, when the first charging control chip detects that the quantity of electricity of the first energy storage device is lower than a first preset value (for example, the first preset value is 20%), the first charging control chip transmits a first charging signal to the photovoltaic array to cause the photovoltaic array to charge the first energy storage device; when the first charging control chip detects that the quantity of electricity of the first energy storage device is equal to a third preset value (for example, the third preset value is 100%), the first charging control chip transmits a first stop charging signal to the photovoltaic array to cause the photovoltaic array to stop charging the first energy storage device. In addition, during the charging process, upon detection of an abnormality such as an overvoltage or a over-temperature in the first energy storage device, the first charging control chip may also transmit the first stop charging signal to the photovoltaic array to stop the photovoltaic array from charging the first energy storage device. By having the first charging control chip and the photovoltaic array, the first energy storage device can be effectively prevented from generating over-discharge, overvoltage, over-charge, over-temperature and the like. In some embodiments, the photovoltaic array is a solar panel, and the photovoltaic array is configured to receive solar energy and convert the solar energy into electrical energy to output the electrical energy to the first energy storage device, thereby charging the first energy storage device. In practical applications, the photovoltaic array may be disposed on a backplane and/or a non-display area of a front cover of the display apparatus. It should be noted that the photovoltaic array can normally charge the first energy storage device when the display apparatus is in an environment with strong light, and when the display apparatus is in an environment with weak ambient light, such as a overcast environment, a night environmental or an indoor environment, the photovoltaic array can absorb less solar energy, which may prevent the photovoltaic array from normally charging the first energy storage device. It should be noted that FIG. 3 only shows a part of the structure of the control circuit according to the embodiment of the present disclosure, but the structure of the control circuit according to the embodiment of the present disclosure in a practical application is not limited to the structure shown in FIG. 3, and may also include other structures, which are not listed one by one herein.

In an embodiment of the present disclosure, the first charging control chip is also coupled to and communicates with a power control chip of the signal generating circuit 33. When the first power source 1 supplies power to the light source 4, and the first charging control chip detects that the quantity of electricity of the first energy storage device is lower than the first preset value for a predetermined time, the first charging control chip transmits a signal indicating that the first energy storage device is low in power to the power control chip of the signal generating circuit 33, and the power control chip of the signal generating circuit 33 provides a control signal, for example, a low level signal, to the first switch element 31 and the inverting circuit 34 according to the signal. The first switch element 31 is turned off by the low level signal, so that the first power source 1 is disconnected from the light source 4; at the same time, the inverting circuit inverts the low level signal to generate a high level signal, and outputs the high level signal to the second switch element 32 to turn on the second switch element 32 under the action of the high level signal, so that the second power source 2 is coupled to the light source 4 to supply power to the light source 4. In some embodiments of the present disclosure, as shown in FIG. 3, the second power source 2 supplies power to the light source 4 through a power output circuit. Therefore, in the case where the quantity of electricity of the first energy storage device is lower than the first preset value for the predetermined time in the process of supplying power from the first power source 1 to the light source 4, the power source of the light source 4 is automatically switched from the first power source 1 to the second power source 2, so that the second power source 2 supplies power to the light source 4.

As shown in FIG. 3, in some embodiments, the second power source 2 includes a second energy storage device, a second charging control chip, and a power supply device. In some embodiments of the present disclosure, the second energy storage device is a lithium battery, and the power supply device may be a back clip charger or a desktop charger suitable for the second energy storage device. In an embodiment of the present disclosure, the power supply device is coupled to the second energy storage device and the second charging control chip, the second charging control chip is coupled to the second energy storage device, a first terminal of the second energy storage device is coupled to the first electrode of the second switch transistor Q2, and the second terminal of the second energy storage device is grounded. The second charging control chip is configured to monitor the quantity of electricity of the second energy storage device and controls the power supply device to charge the second energy storage device, and the second energy storage device is configured to supply power to the light source 4 when the power source of the light source 4 is switched from the first power source 1 to the second power source 2 as needed. In some embodiments, when the second charging control chip detects that the quantity of electricity of the second energy storage device is lower than a second preset value (for example, the second preset value is 20%), the second charging control chip transmits a second charging signal to the power supply device to cause the power supply device to charge the second energy storage device; when the second charging control chip detects that the quantity of electricity of the second energy storage device is equal to a fourth preset value (for example, the fourth preset value is 100%), the second charging control chip transmits a second stop charging signal to the power supply device to cause the power supply device to stop charging the second energy storage device. In addition, during the charging process, upon detection of an abnormality such as an over-voltage or an over-temperature in the second energy storage device, the second charging control chip may also transmit the second stop charging signal to the power supply device to cause the power supply device to stop charging the second energy storage device. By having the second charging control chip and the power supply device, the second energy storage device can be effectively prevented from generating over-discharge, over-voltage, over-charge, over-temperature and the like.

In an embodiment of the present disclosure, the second charging control chip is coupled to and communicates with the power control chip in the signal generating circuit 33. When the second power source 2 supplies power to the light source 4, and the second charging control chip detects that the quantity of electricity of the second energy storage device is lower than the second preset value for a predetermined time, the second charging control chip transmits a signal indicating that the second energy storage device is low in power to the power control chip of the signal generating circuit 33, and the power control chip of the signal generating circuit 33 provides a control signal, for example, a high level signal, to the first switch element 31 and the inverting circuit 34 according to the signal. The first switch element 31 is turned on by the high level signal, so that the first power source 1 is coupled to and supplies power to the light source 4. In some embodiments of the present disclosure, as shown in FIG. 3, the first power source 1 (the first energy storage device) supplies power to the light source 4 through the power output circuit; at the same time, the inverting circuit 34 inverts the high level signal to generate a low level signal, and outputs the low level signal to the second switch element 32, so that the second switch element 32 is turned off by the low level signal, thereby disconnecting the second power source 2 from the light source 4. Therefore, in the case where the quantity of electricity of the second energy storage device is lower than the second preset value for the predetermined time in the process of supplying power from the second power source 2 to the light source 4, the power source of the light source 4 is automatically switched from the second power source 2 to the first power source 1, so that the first power source 1 supplies power to the light source 4, in some embodiments of the present disclosure, the first energy storage device supplies power to the light source 4.

In some embodiments, when the first power source 1 supplies power to the light source 4, the light source 4 is powered by a constant voltage and a constant current, and when the second power source 2 supplies power to the light source 4, the light source 4 is powered by a constant voltage and a constant current, which facilitate the control device to control the switching between the power sources, and at the same time can effectively avoid the disadvantages of instable power supply during control of the switching between the power sources.

Figure 4:
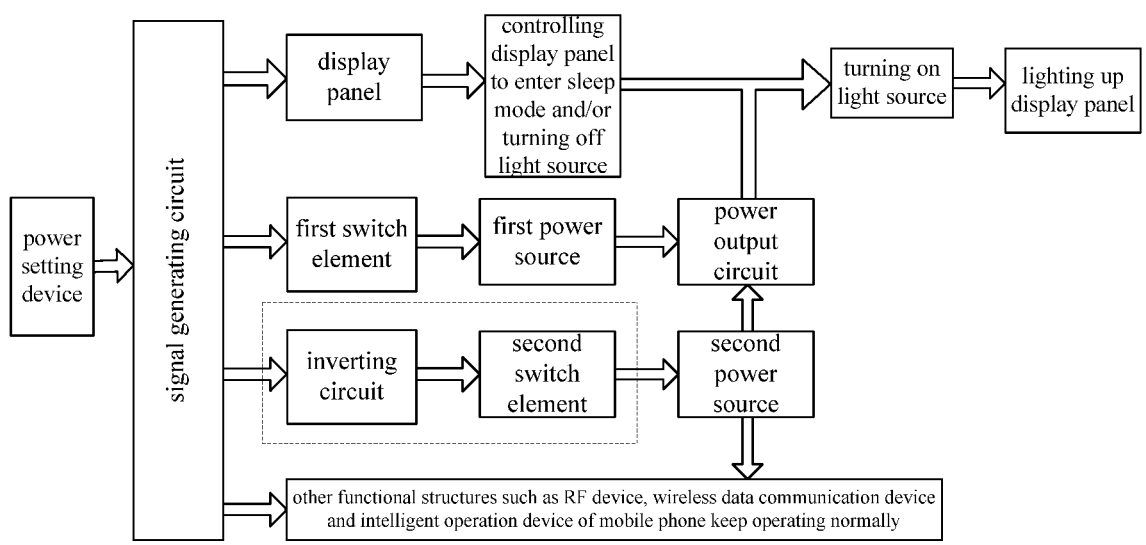
FIG. 4 is a schematic diagram showing an operation of a control circuit according to an embodiment of the present disclosure.

FIG. 4 is a schematic diagram showing an operation of a control circuit according to an embodiment of the present disclosure in a practical application, and FIG. 4 illustrates a process of switching the power source of the light source from the second power source to the first power source in a display apparatus. The working principle of the control circuit according to the embodiment of the present disclosure will be described in detail below with reference to FIG. 3 and FIG. 4.

As shown in FIG. 3 and FIG. 4, in practical applications, by taking the case where the display apparatus is a mobile phone as an example, when a user of the mobile phone selects the first power source to supply power to the light source through a power setting device in an operating system of the mobile phone, that is, transmits a power source selection instruction to the signal generating circuit, the signal generating circuit controls a display panel of the mobile phone to enter a sleep mode and/or turns off the light source of the display panel according to the power source selection instruction, and simultaneously transmits a high level signal to the input terminal of the inverting circuit and the control electrode of the first switch element according to the power source selection instruction. The first switch element is turned on by the high level signal at the control electrode of the first switch element, so that the first power source is coupled to the light source of the display panel to enable the first power source to supply power to the light source through the power output circuit.

At the same time, the inverting circuit inverts the high level signal, outputs a low level signal to the control electrode of the second switch element, and the second switch element is turned off by the low level signal at the control electrode of the second switch element, thereby disconnecting the second power source from the light source of the display panel.

So far, switching the power source of the light source from the second power source to the first power source has been completed, and the first power source supplies power to the light source of the display panel. At this time, the light source of the display panel is powered by the first power source and re-lighted, and the display panel is in a bright screen state.

It should be noted that although the second power source no longer supplies power to the light source of the display panel after the switching is completed, the second power source continues supplying power to other functional structures of the mobile phone, such as, a radio frequency device, a wireless data communication device, and an intelligent operation device of the mobile phone. In other words, in the process of switching between the first power source and the second power source that supply power to the light source, that is, in the processes that the display panel enters the sleep mode and the display panel is lit up, other structures of the mobile phone, such as the radio frequency device, the wireless data communication device and the intelligent operation device are powered by the second power source and operate normally. In the embodiment of the present disclosure, the first power source only supplies power to the light source of the display panel, but the second power source can supply power to the light source of the display panel, and also keeps supplying power to other structures of the mobile phone, such as the radio frequency device, the wireless data communication device, and the intelligent operation device. That is, in the process of switching between the first power source and the second power source that supply power to the light source, other functional structures of the mobile phone, such as the radio frequency device, the wireless data communication device, and the intelligent operation device do not need to be powered off and restarted, thereby avoiding re-reading user and system data when the mobile phone is lit, saving power consumption and reducing the response time of the mobile phone system.

In the control circuit according to the embodiment of the present disclosure, the control device is configured to control the first power source to supply power to the light source or control the second power source to supply power to the light source, so that the light source can be separately powered by one power source, thereby avoiding large power consumption due to the use of the common power source to supply power to the light source, and improving the battery life of the display apparatus. In the embodiment of the present disclosure, in the process of switching between the first power source and the second power source that supply power to the light source, the second power source continuously supplies power to other functional structures of the display apparatus, so that the other functional structures do not need to be powered off and restarted, thereby avoiding re-reading user and system data when the mobile phone is lit, saving power consumption, reducing the response time of the mobile phone system, and improving the battery life of the display apparatus. The control circuit according to the embodiment of the present disclosure can also achieve switching between the second power source and the first power source that supply power to the light source, and has strong operability, and the switching process is convenient and fast, thereby improving the operating experience of the user of the display apparatus.

Figure 5:
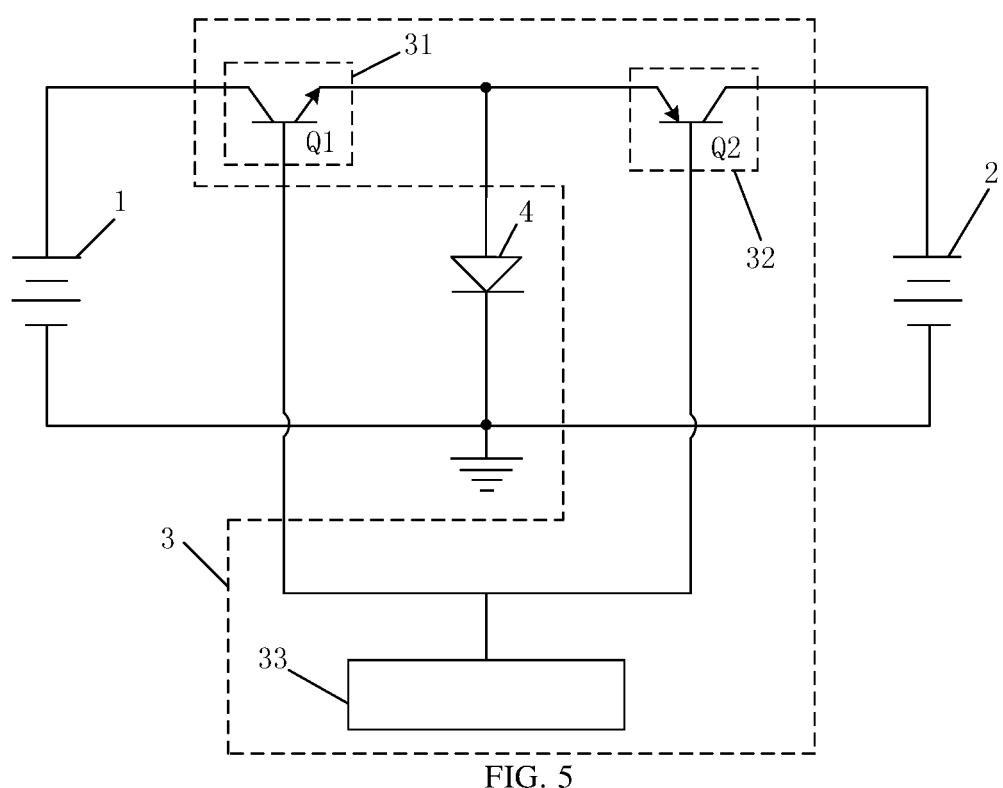
FIG. 5 is a schematic structural diagram of a control circuit according to an embodiment of the present disclosure.

FIG. 5 is a schematic structural diagram of a control circuit according to an embodiment of the present disclosure. As shown in FIG. 5, differences between this embodiment and the above embodiments lie in that the control device includes a first switch element 31, a second switch element 32 and a signal generating circuit 33, the first switch element 31 is coupled to the first power source 1, the light source 4 and the signal generating circuit 33, and the second switch element 32 is coupled to the second power source 2, the light source 4 and the signal generating circuit 33.

The signal generating circuit 33 is configured to control the connection of the first power source 1 with the light source 4 through the first switch element 31; and control the connection of the second power source 2 with the light source 4 through the second switch element 32.

In this embodiment, the first switch element 31 includes a first switch transistor Q1, a first electrode of the first switch transistor Q1 is coupled to the first power source 1, a second electrode of the first switch transistor Q1 is coupled to the light source 4, and a control electrode of the first switch transistor Q1 is coupled to the signal generating circuit 33.

In this embodiment, the second switch element 32 includes a second switch transistor Q2, a first electrode of the second switch transistor Q2 is coupled to the second power source 2, a second electrode of the second switch transistor Q2 is coupled to the light source 4, and a control electrode of the second switch transistor Q2 is coupled to the signal generating circuit 33.

In this embodiment, the first switch transistor Q1 is an N-type thin film transistor, and the second switch transistor Q2 is a P-type thin film transistor; or the first switch transistor Q1 is a P-type thin film transistor, and the second switch transistor Q2 is an N-type thin film transistor. It should be noted that FIG. 5 only shows the case where the first switch transistor Q1 is an N-type thin film transistor and the second switch transistor Q2 is a P-type thin film transistor, and the case where the first switch transistor Q1 is a P-type thin film transistor, and the second switch transistor Q2 is an N-type thin film transistor is not shown.

In some embodiments of the present disclosure, in the case where the first switch transistor Q1 is an N-type thin film transistor and the second switch transistor Q2 is a P-type thin film transistor, the signal generating circuit 33 is configured to provide a control signal, for example, a high level signal, to the first switch element 31 and the second switch element 32, so that the first switch element 31 is turned on by the high level signal, thereby coupling the first power source 1 to the light source 4 to supply power to the light source 4; meanwhile, the second switch element 32 is turned off by the high level signal to disconnect the second power source 2 from the light source 4. Alternatively, the signal generating circuit 33 is configured to supply a control signal, for example, a low level signal, to the first switch element 31 and the second switch element 32, so that the second switch element 32 is turned on by the low level signal, thereby coupling the second power source 2 to the light source 4 to supply power to the light source 4; meanwhile, the first switch element 31 is turned off by the low level signal to disconnect the first power source 1 from the light source 4. It should be noted that for the case where the first switch transistor Q1 is a P-type thin film transistor and the second switch transistor Q2 is an N-type thin film transistor, reference may be made to the case where the first switch transistor Q1 is an N-type thin film transistor and the second switch transistor Q2 is a P-type thin film transistor, and details thereof are not described herein again.

For other structures of the control circuit according to this embodiment, reference may be made to the description of the foregoing embodiments, and details thereof are not described herein again.

In the control circuit according to the embodiment, the control device is configured to control the first power source to supply power to the light source or control the second power source to supply power to the light source, so that the light source can be separately powered by one power source, thereby avoiding large power consumption due to the use of the common power source to supply power to the light source, and improving the battery life of the display apparatus. In this embodiment, during the switching between the first power source and the second power source that supply power to the light source, the second power source continuously supplies power to other functional structures of the display apparatus, so that the other functional structures do not need to be powered off and restarted, which avoids re-reading user and system data when the mobile phone is lit, saves power consumption and shortens the response time of the mobile phone system, thereby improving the battery life of the display apparatus. The control circuit according to the embodiment can also achieve switching between the second power source and the first power source that supply power to the light source, and has strong operability, and the switching process is convenient and fast, thereby improving the operating experience of the user of the display apparatus.

Embodiments of the present disclosure also provide a display apparatus including a light source, a display panel, and the control circuit according to the above embodiments.

For the control circuit in this embodiment, reference may be made to the description of the foregoing embodiments, and details thereof are not described herein again.

In the display apparatus according to the embodiment, the control device is configured to control the first power source or the second power source to supply power to the light source, so that the light source can be separately powered by one power source, thereby avoiding large power consumption due to the use of the common power source to supply power to the light source, and improving the battery life of the display apparatus. In this embodiment, during the switching between the first power source and the second power source that supply power to the light source, the second power source continuously supplies power to other functional structures of the display apparatus, so that the other functional structures do not need to be powered off and restarted, which avoids re-reading user and system data when the mobile phone is lit, saves power consumption and shortens the response time of the mobile phone system, thereby improving the battery life of the display apparatus. The embodiment can also achieve switching between the second power source and the first power source that supply power to the light source, and has strong operability, and the switching process is convenient and fast, thereby improving the operating experience of the user of the display apparatus. Embodiments of the present disclosure provide a method for supplying power to a light source in a display apparatus, the display apparatus including a light source and a control circuit, the control circuit including a first power source, a second power source, and a control device, the first power source and the second power source being both coupled to the control device; the method including:

controlling, by the control device, at least one of the first power source and the second power source to supply power to the light source.

The control device includes a first switch element, a second switch element, a signal generating circuit and an inverting circuit; the first switch element is coupled to the first power source, the light source, and the signal generating circuit, the second switch element is coupled to the second power source, the light source, and the inverting circuit, and the inverting circuit is coupled to the signal generating circuit.

In the case where the control device controls the first power source to supply power to the light source, the method may include:

controlling, by the signal generating circuit, the first power source to be coupled to the light source through the first switch element, so that the first power source supplies power to the light source.

In some embodiments of the present disclosure, controlling, by the signal generating circuit, the first power source to be coupled to the light source through the first switch element, so that the first power source supplies power to the light source includes steps 301 to 303.

Step 301 includes providing, by the signal generating circuit, a first control signal to the first switch element and the inverting circuit. For example, the first control signal is a high level signal.

Step 302 includes controlling, by the first switch element, the first power source to be coupled to the light source according to the first control signal, so as to control the first power source to supply power to the light source. In some embodiments of the present disclosure, the first switch element is turned on by the first control signal, thereby controlling the first power source to be coupled to the light source.

Step 303: inverting the first control signal provided by the signal generating circuit to generate an inverted signal and outputting the inverted signal to the second switch element by the inverting circuit, and controlling, by the second switch element, the second power source to be disconnected from the light source according to the inverted signal. For example, the inverting circuit inverts a high level signal to generate a low level signal, so that the inverting circuit outputs the low level signal to the second switch element, and the second switch element controls the second power source to be disconnected from the light source under the action of the low level signal outputted from the inverting circuit.

It can be understood that step 302 and step 303 may be performed simultaneously; or, step 303 may be performed before step 302.

In the case where the control device controls the second power source to supply power to the light source, the method may include:

controlling, by the signal generating circuit, the second power source to be coupled to the light source through the inverting circuit and the second switch element, so that the second power source supplies power to the light source.

In some embodiments of the present disclosure, controlling, by the signal generating circuit, the second power source to be coupled to the light source through the inverting circuit and the second switch element, so that the second power source supplies power to the light source includes steps 401 to step 403.

Step 401 includes, providing, by the signal generating circuit, a second control signal to the first switch element and the inverting circuit. For example, the second control signal is a low level signal.

Step 402 includes inverting the second control signal provided by the signal generating circuit to generate an inverted signal and outputting the inverted signal to the second switch element by the inverting circuit, and controlling, by the second switch element, the second power source to be coupled to the light source according to the inverted signal, so as to control the second power source to supply power to the light source. In some embodiments of the present disclosure, the inverting circuit inverts the low level signal to generate a high level signal, so that the inverting circuit outputs the high level signal to the second switch element, and the second switch element controls the second power source to be coupled to the light source under the action of the high level signal outputted from the inverting circuit.

Step 403 includes controlling, by the first switch element, the first power source to be disconnected from the light source according to the second control signal. For example, the first switch element controls the first power source to be disconnected from the light source under the action of the low level signal provided by the signal generating circuit.

It can be understood that step 402 and step 403 may be performed simultaneously; or step 403 may be performed before step 402.

Further, in the case where the power source of the light source is switched from the second power source to the first power source, the method includes: receiving, by the signal generating circuit, a power source selection instruction; controlling the display panel of the display apparatus to enter the sleep mode and/or turning off the light source of the display panel according to the power source selection instruction; controlling, by the first switch element, the first power source to be coupled to the light source, so that the first power source supplies power to the light source; controlling, by the inverting circuit and the second switch element, the second power source to be disconnected from the light source; and lighting the light source of the display panel again. During the process of switching the power source of the light source from the second power source to the first power source, the other functional structures of the display apparatus keep coupled to the second power source.

The method for supplying power to the light source in the display apparatus according to the embodiment is used for supplying power to the light source in the display apparatus according to the above embodiments. For detailed description of the display apparatus, reference may be made to the above embodiments, and details thereof are not described herein again.

In the method for supplying power to the light source in the display apparatus according to the embodiment, the control device controls the first power source to supply power to the light source or controls the second power source to supply power to the light source, so that the light source can be separately powered by one power source, thereby avoiding large power consumption due to the use of the common power source to supply power to the light source, and improving the battery life of the display apparatus. In the embodiment, in the process of switching between the first power source and the second power source that supply power to the light source, the second power source continuously supplies power to other functional structures of the display apparatus, so that the other functional structures do not need to be powered off and restarted, thereby avoiding re-reading user and system data when the mobile phone is lit, saving power consumption, reducing the response time of the mobile phone system, and improving the battery life of the display apparatus. The embodiment can also achieve switching between the second power source and the first power source that supply power to the light source, and has strong operability, and the switching process is convenient and fast, thereby improving the operating experience of the user of the display apparatus.

Embodiments of the present disclosure further provide a method for supplying power to a light source in a display apparatus, the display apparatus including a light source and a control circuit, the control circuit including a first power source, a second power source, and a control device, the first power source and the second power source being both coupled to the control device; the method including:

controlling, by the control device, at least one of the first power source and the second power source to supply power to the light source.

The control device may include a first switch element, a second switch element, and a signal generating circuit; the first switch element is coupled to the first power source, the light source, and the signal generating circuit, and the second switch element is coupled to the second power source, the light source, and the signal generating circuit.

In the case where the control device controls the first power source to supply power to the light source, the method may include:

controlling, by the signal generating circuit, the first power source to be coupled to the light source through the first switch element, so that the first power source supplies power to the light source.

In some embodiments of the present disclosure, controlling, by the signal generating circuit, the first power source to be coupled to the light source through the first switch element, so that the first power source supplies power to the light source includes steps 501 to 503.

Step 501 includes providing, by the signal generating circuit, a first control signal to the first switch element and the second switch element. For example, the first control signal is a high level signal.

Step 502 includes controlling, by the first switch element, the first power source to be coupled to the light source according to the first control signal to control the first power source to supply power to the light source. In some embodiments of the present disclosure, the first switch element is turned on by the first control signal to control the first power source to be coupled to the light source.

Step 503 includes controlling, by the second switch element, the second power source to be disconnected from the light source according to the first control signal. In some embodiments of the present disclosure, the second switch element is turned off by the second control signal to control the second power source to be disconnected from the light source.

It can be understood that step 502 and step 503 may be performed simultaneously; or, step 503 may be performed before step 502.

In the case where the control device controls the second power source to supply power to the light source, the method may include:

controlling, by the signal generating circuit, the second power source to be coupled to the light source through the second switch element, so that the second power source supplies power to the light source.

In some embodiments of the present disclosure, controlling, by the signal generating circuit, the second power source to be coupled to the light source through the second switch element, so that the second power source supplies power to the light source includes steps 601 to 603.

Step 601 includes providing, by the signal generating circuit, a second control signal to the first switch element and the second switch element. For example, the second control signal is a low level signal.

Step 602 includes controlling, by the second switch element, the second power source to be coupled to the light source according to the second control signal to control the second power source to supply power to the light source. In some embodiments of the present disclosure, the second switch element is turned on by the low level signal to control the second power source to be coupled to the light source.

Step 603 includes controlling, by the first switch element, the first power source to be disconnected from the light source according to the second control signal. In some embodiments of the present disclosure, the first switch element controls the first power source to be disconnected from the light source under the action of the low level signal provided by the signal generating circuit.

It can be understood that step 602 and step 603 may be performed simultaneously; or step 603 may be performed before step 602.

Further, in the case where the power source of the light source is switched from the second power source to the first power source, the method includes: receiving, by the signal generating circuit, a power source selection instruction; controlling the display panel of the display apparatus to enter the sleep mode and/or turning off the light source of the display panel according to the power source selection instruction; controlling, by the first switch element, the first power source to be coupled to the light source, so that the first power source supplies power to the light source; controlling, by the second switch element, the second power source to be disconnected from the light source; and lighting the light source of the display panel again. During the process of switching the power source of the light source from the second power source to the first power source, the other functional structures of the display apparatus keep coupled to the second power source.

The method for supplying power to the light source in the display apparatus according to the embodiment is used to supply power to the light source in the display apparatus according to the above embodiments. For detailed description of the display apparatus, reference may be made to the above embodiments, and details thereof are not described herein again.

In the method for supplying power to the light source in the display apparatus according to the embodiment, the control device controls the first power source to supply power to the light source or controls the second power source to supply power to the light source, so that the light source can be separately powered by one power source, thereby avoiding large power consumption due to the use of the common power source to supply power to the light source, and improving the battery life of the display apparatus. In the embodiment, in the process of switching between the first power source and the second power source that supply power to the light source, the second power source continuously supplies power to other functional structures of the display apparatus, so that the other functional structures do not need to be powered off and restarted, thereby avoiding re-reading user and system data when the mobile phone is lit, saving power consumption, reducing the response time of the mobile phone system, and improving the battery life of the display apparatus. The embodiment can also achieve switching between the second power source and the first power source that supply power to the light source, and has strong operability, and the switching process is convenient and fast, thereby improving the operating experience of the user of the display apparatus.

It could be understood that the above embodiments are merely exemplary embodiments adopted for describing the principle of the present disclosure, but the present disclosure is not limited thereto. Various variations and improvements may be made by those of ordinary skill in the art without departing from the spirit and essence of the present disclosure, and these variations and improvements shall also be regarded as falling into the protection scope of the present disclosure.

The invention claimed is:

1. A control circuit, comprising a first power source, a second power source, and a control device,
    wherein the first power source and the second power source are both coupled to the control device;
    the control device is configured to control a connection between the first power source and a light source and a connection between the second power source and the light source,
    the control device comprises a first switch element, a second switch element, a signal generating circuit, and an inverting circuit;
    the first switch element is coupled to the first power source, the light source, and the signal generating circuit; the second switch element is coupled to the second power source, the light source, and the inverting circuit;
    the inverting circuit is coupled to the signal generating circuit, the inverting circuit is an inverting amplifier, an input terminal of the inverting amplifier is coupled to the signal generating circuit, and an output terminal of the inverting amplifier is coupled to the second switch element; and
    the signal generating circuit is configured to: control the connection between the first power source and the light source though the first switch element; and control the connection between the second power source and the light source through the inverting circuit and the second switch element.

2. The control circuit of claim 1, wherein the first switch element comprises a first switch transistor, a first electrode of the first switch transistor is coupled to the first power source, a second electrode of the first switch transistor is coupled to the light source, and a control electrode of the first switch transistor is coupled to the signal generating circuit.

3. The control circuit of claim 1, wherein the second switch element comprises a second switch transistor, a first electrode of the second switch transistor is coupled to the second power source, a second electrode of the second switch transistor is coupled to the light source, and a control electrode of the second switch transistor is coupled to the inverting circuit.

4. The control circuit of claim 1, wherein the first power source comprises a first energy storage device, a first charging control chip, and a photovoltaic array; and
    the first charging control chip is configured to monitor a quantity of electricity of the first energy storage device and control the photovoltaic array to charge the first energy storage device.

5. The control circuit of claim 1, wherein the second power source comprises a second energy storage device, a second charging control chip, and a power supply device, and
    the second charging control chip is configured to monitor a quantity of electricity of the second energy storage device and control the power supply device to charge the second energy storage device.

6. The control circuit of claim 5, wherein the second energy storage device is a lithium battery, and the power supply device is a charger suitable for the second energy storage device.

7. The control circuit of claim 1, wherein the first power source is configured to supply power to the light source by a constant voltage and a constant current in response to being coupled to the light source, and the second power source is configured to supply power to the light source by a constant voltage and a constant current in response to being coupled to the light source.

8. A display apparatus, comprising a light source and a control circuit, wherein the control circuit is the control circuit of claim 1, and the control device in the control circuit is configured to control a connection between the first power source and the light source of the display apparatus and a connection between the second power source and the light source of the display apparatus.

9. The display apparatus of claim 8, wherein the first power source is configured to supply power only to the light source, and the second power source is configured to supply power to other functional structure in the display apparatus in addition to the light source.

10. The display apparatus of claim 9, wherein during a process of controlling, by the control device, a power source of the light source to be switched from the second power source to the first power source, the other functional structure of the display apparatus keeps coupled to the second power source.

11. The display apparatus of claim 8, wherein the light source is a backlight of the display apparatus.

12. A control circuit, comprising a first power source, a second power source, and a control device,
wherein the first power source and the second power source are both coupled to the control device;
the control device is configured to control a connection between the first power source and a light source and a connection between the second power source and the light source;
the control device comprises a first switch element, a second switch element and a signal generating circuit,
the first switch element comprises a first switch transistor, a first electrode of the first switch transistor is coupled to the first power source, a second electrode of the first switch transistor is coupled to the light source, and a control electrode of the first switch transistor is coupled to the signal generating circuit;
the second switch element comprises a second switch transistor, a first electrode of the second switch transistor is coupled to the second power source, a second electrode of the second switch transistor is coupled to the light source, and a control electrode of the second switch transistor is coupled to the signal generating circuit;
the signal generating circuit is configured to: control the connection between the first power source and the light source through the first switch element; and control the connection between the second power source and the light source through the second switch element; and
the first switch transistor is one of an N-type thin film transistor and a P-type thin film transistor, and the second switch transistor is the other of the N-type thin film transistor and the P-type thin film transistor.

13. A method for supplying power to a light source in a display apparatus, wherein the display apparatus comprises a light source and a control circuit, the control circuit comprises a first power source, a second power source and a control device, the first power source and the second power source are both coupled to the control device; and the method comprises:

controlling, by the control device, at least one of the first power source and the second power source to supply power to the light source; and
controlling, by the control device, a power source of the light source to be switched from the second power source to the first power source,
wherein controlling, by the control device, the power source of the light source to be switched from the second power source to the first power source comprises: receiving, by the signal generating circuit, a power source selection instruction indicating that the first power source is to supply power to the light source; controlling a display panel of the display apparatus to enter a sleep mode and/or turning off the light source of the display panel according to the power source selection instruction; controlling the first power source to be coupled to the light source; controlling the second power source to be disconnected from the light source; and lighting the light source of the display panel again.

14. The method of claim 13, wherein the control device comprises a first switch element, a second switch element, a signal generating circuit and an inverting circuit; the first switch element is coupled to the first power source, the light source and the signal generating circuit, the second switch element is coupled to the second power source, the light source and the inverting circuit, and the inverting circuit is coupled to the signal generating circuit;
controlling, by the control device, the first power source to supply power to the light source comprises:
controlling, by the signal generating circuit, the first power source to be coupled to the light source through the first switch element to enable the first power source to supply power to the light source; and
controlling, by the control device, the second power source to supply power to the light source comprises:
controlling, by the signal generating circuit, the second power source to be coupled to the light source through the inverting circuit and the second switch element to enable the second power source to supply power to the light source.

15. The method of claim 13, wherein the control device comprises a first switch element, a second switch element and a signal generating circuit; the first switch element is coupled to the first power source, the light source and the signal generating circuit, and the second switch element is coupled to the second power source, the light source and the signal generating circuit;
controlling, by the control device, the first power source to supply power to the light source comprises:
controlling, by the signal generating circuit, the first power source to be coupled to the light source through the first switch element to enable the first power source to supply power to the light source; and
controlling, by the control device, the second power source to supply power to the light source comprises:
controlling, by the signal generating circuit, the second power source to be coupled to the light source through the second switch element to enable the second power source to supply power to the light source.

16. The method of claim 13, wherein during a process of controlling, by the control device, the power source of the light source to be switched from the second power source to the first power source, other functional structures of the display apparatus keep coupled to the second power source.

* * * * *